United States Patent
Holmquist

[15] 3,690,017
[45] Sept. 12, 1972

[54] COIN VALUE TEACHING DEVICE

[72] Inventor: Larry M. Holmquist, 1526 Crawford St., St. Paul, Minn. 55113

[22] Filed: July 2, 1971

[21] Appl. No.: 159,142

[52] U.S. Cl. ............................................... 35/24 R
[51] Int. Cl. ............................................. G09b 19/18
[58] Field of Search .......... 35/24 R, 31 R, 31 D, 31 F

[56] References Cited

UNITED STATES PATENTS

| | | | |
|---|---|---|---|
| 2,502,238 | 3/1950 | Wade et al. | 35/31 F |
| 3,488,864 | 1/1970 | McManus | 35/24 R |

*Primary Examiner*—Wm H. Grieb

[57] ABSTRACT

A coin value teaching device comprises a square number board having the square peripheral flange secured thereto, and having its upper surface arranged in squares. The squares which are arranged in transverse rows each has a number therein, the numbers including the numbers one to one hundred. A plurality of transparent value members having coins secured thereto may be placed upon the board, singularly or in groups, so that the last square and number covered by the value member or members indicates the numerical value of the coins of the value members being used. This system has been found to be effective in teaching children, and especially retarded children, how to handle, count, and change money. The invention described herein was made in the course of, or under, a grant with the Department of Health, Education, and Welfare. VRA Grant RD-1810-G.

2 Claims, 10 Drawing Figures

INVENTOR.
Larry M. Holmquist

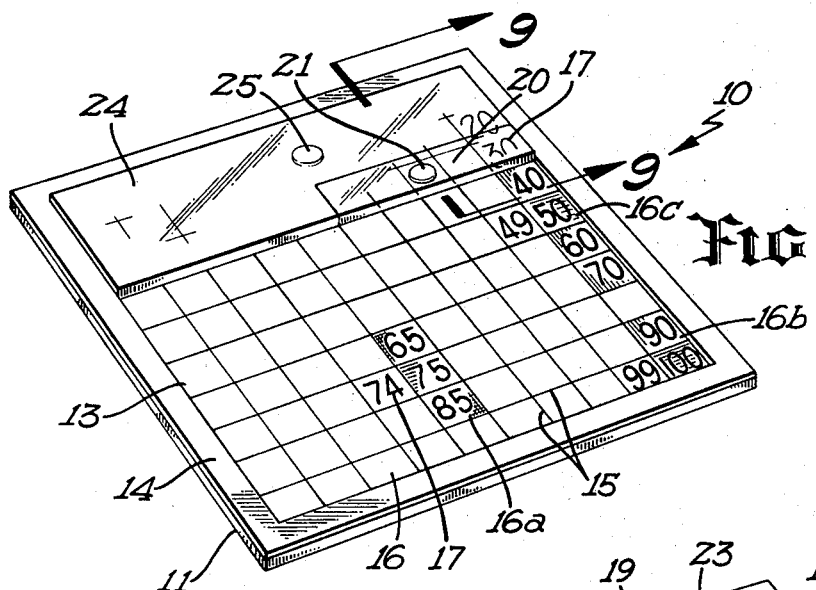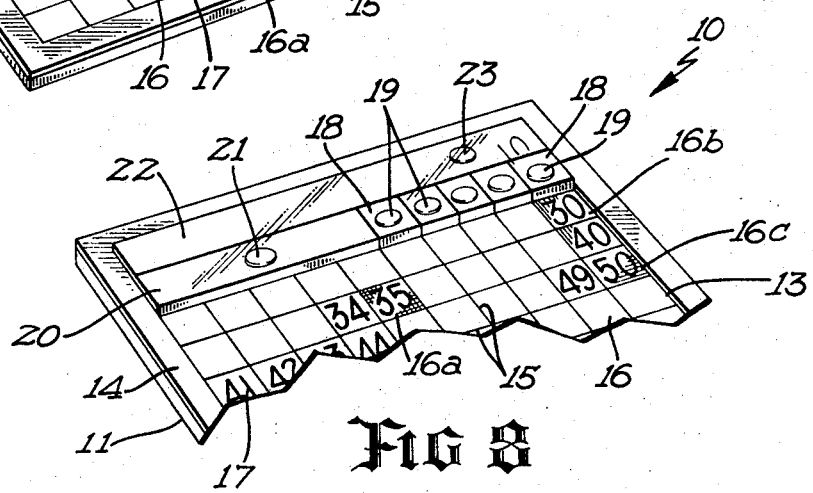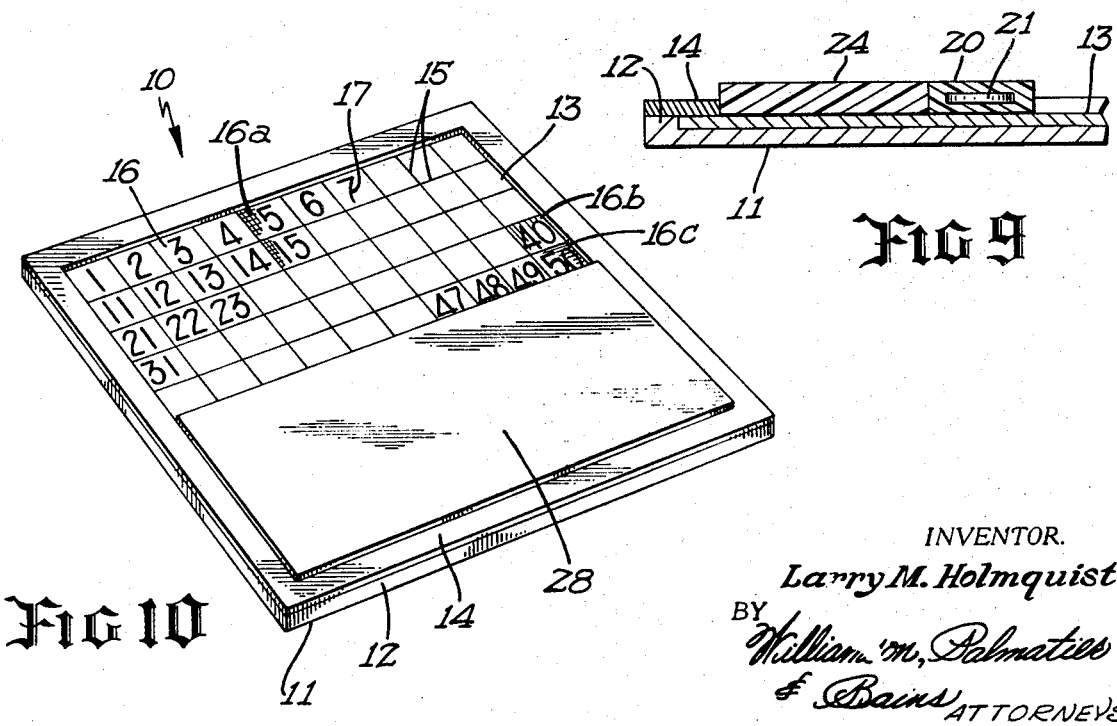

COIN VALUE TEACHING DEVICE

SUMMARY OF THE INVENTION

One of the problems associated with teaching mentally retarded children how to count and handle money is the problem of conveying to the child the value of coins. Thus, it is difficult for a mentally retarded child to comprehend the abstract value assigned to coins. Even though mentally retarded children are capable of counting by rote from 1 to 100, it is difficult for such children to apply this counting system to coins they may use. For example, if a student has several coins of one denomination such as nickels, he can learn to count by fives, or alternatively by ones if pennies are being used. However, mentally retarded children have difficulty in arriving at a total numerical monetary value with respect to several different value coins.

It is therefore a general object of this invention to provide a coin value teaching device which is highly effective in teaching children, especially mentally retarded children, not only how to count coins but also how to make change with respect to such coins.

More specifically, the present invention is directed to a coin value teaching device which is comprised of a rectangular number board having an upper surface which is arranged into squares, each having a number therein. The squares are numbered from 1 to 100 and are arranged in transverse rows, ten such rows being provided. Transparent flat value members are used and when applied to the number board cover a predetermined number of the squares. A plurality of the value members may be used and are applied in covering relation to the squares beginning with the first transverse row. Each of the value members has a coin secured thereto so that the child makes an association between the value form and the coin. By determining the last number covered in a transverse row by a value member or members, the child can readily make a visual relationship between a number value and a coin value. These and other objects and advantages of this invention will more fully appear from the following description made in connection with the accompanying drawings wherein like reference characters refer to the same or similar parts throughout the several views.

BRIEF DESCRIPTION OF THE FIGURES OF THE DRAWING

FIG. 7 is a perspective view illustrating a plurality of value members applied to the number board;

FIG. 8 is a fragmentary perspective view illustrating a plurality of different value members applied to the number board;

FIG. 9 is a cross-sectional view taken approximately along line 9—9 of FIG. 7 and looking in the direction of the arrows; and FIG. 10 is a perspective view of the number board with a change-making value member applied thereto.

DETAILED DESCRIPTION OF THE INVENTION

Figure 1:
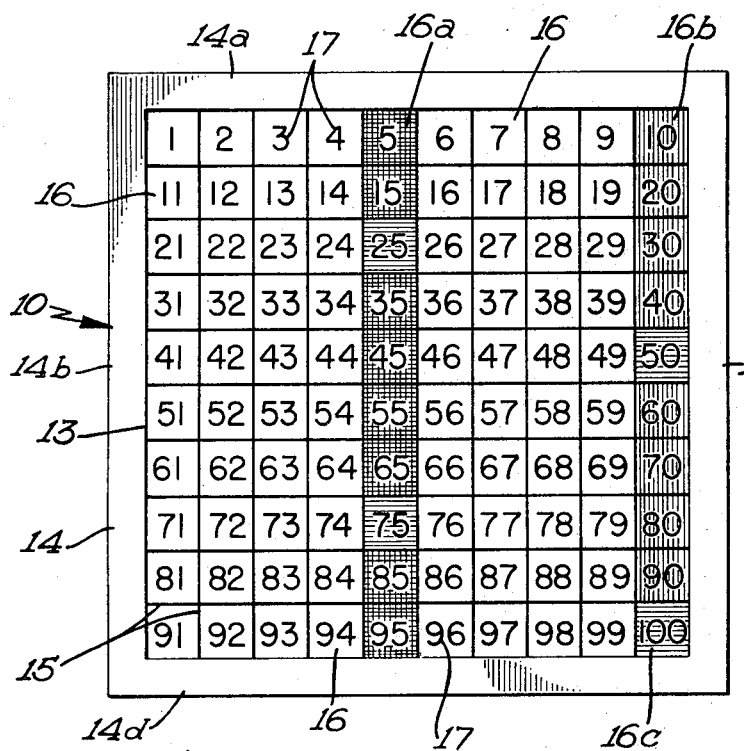
FIG. 1 is a plan view of the number board which comprises a component of the coin value teaching device.
Figure 2:
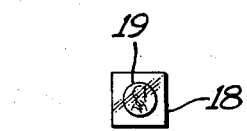
FIG. 2 through FIG. 6 illustrate the various value members which constitute components of the present device, each value member representing a different coin.

Referring now to the drawings and more specifically to FIGS. 1 and 9, it will be seen that the present coin value teaching device includes a generally rectangular shaped number board 10. The number board 10 includes a base or back member 11 having a lip 12 projecting from the entire periphery of the back member. A substantially flat rectangular number panel 13 which may also be formed of a suitable rigid material such as wood, pressed board or the like is applied to the upper surface of the base 11 and is secured thereto so that its upper surface is disposed coplanar with the upper surface of the peripheral lip 12. Flange elements are secured to the peripheral lip and edge portions of the number panel and project upwardly therefrom to define a continuous rectangular shaped peripheral flange 14.

The number panel 13 has spaced apart parallel transverse and spaced apart parallel longitudinal lines 15 applied to the upper surface thereof so that a grid design formed of squares 16 are defined by the upper surface of the number panel. It will be noted that the squares 16 are of equal size and are arranged in transverse and longitudinal rows. There are 10 squares in each transverse row and there are 10 such rows. Each square 16 has indicia 17 therein applied to the upper surface of the number panel 13 and the indicia constitutes consecutive numbers from 1 to 100. It will be noted that the numbers are arranged consecutively in the transverse rows from right to left as viewed in FIG. 1 so that the number 100 is diagonally disposed with respect to the number 1. It will also be noted that the number ten and multiples thereof are arranged in a vertical row as best seen in FIG. 1. Similarly, the number 5 and every other number ending with the digit 5 is also arranged in a vertical row, as best seen in FIG. 1.

Most of the squares 16 are white, the number preferably being black, but other similar contrasting color relationships may also be used. The vertical row of squares including the number 5 have a different color background and in the embodiment shown, this color background of these squares is yellow. However, it is pointed out that the squares containing the numbers 25 and 75, as well as the squares containing the number 50 and 100 also have a different color background than the remaining squares of the number board. In the embodiment shown, these four squares are colored blue. Similarly, the vertical row of squares contain the number 10 and the multiples thereof (except the squares containing the number 50 and the number 100) have a different background color than the remaining squares and this color is preferably red. Using four sets of colored squares (white, yellow for digits ending in 5, red for digits ending in 0, and blue for multiples of 25) assist the child in manipulating and using the coil value teaching device.

Figure 3:
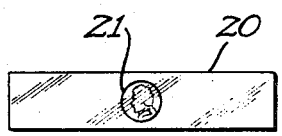

Referring now to FIGS. 2, 3, 4 and 5, it will be seen that a number of different coin value members are there shown. The value members are all formed of suitable rigid transparent plastic material and each has a coin secured thereto to designate the coin with which the value members are associated. For example, in FIG. 2, the value member 18 has a penny 19 secured thereto and this value member is of square configuration and corresponds in size and shape to a square 16. The value member 20 illustrated in FIG. 3 is of elongate rectangular configuration and has a nickel 21 secured thereto. The value member when placed on the transverse row of squares on the number board will cover precisely five such squares.

Figure 4:
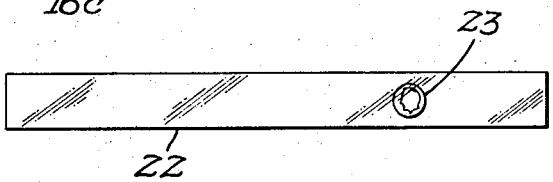
Figure 5:
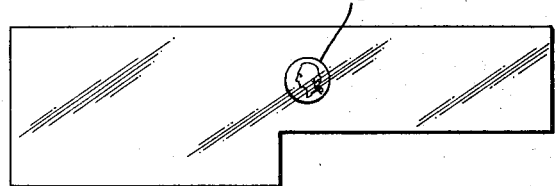
Figure 6:
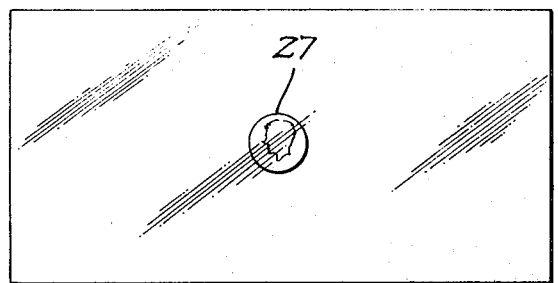

The value member 22 illustrated in FIG. 4 has a dime coin secured thereto and this value member is of elongate rectangular configuration. The value member 22 is of a size and shape to completely cover an entire transverse row of squares. The value member 24 illustrated in FIG. 5 has a quarter coin secured thereto and this value member is of unsymmetrical configuration. The value member 24 is adapted to cover the squares constituting 2½ transverse rows of the number board. Thus if the value member 24 were positioned on the number board 10, so that its upper transverse edge was positioned against the upper transverse flange portion of the peripheral flange 14, the value member would cover 25 squares, including the upper 2½ transverse rows. The value member 26 illustrated in FIG. 6 is of rectangular configuration and has a half dollar coin 27 secured thereto. The value member 26 is of a size to cover five transverse rows of squares on the number board, or one-half of the surface area thereof.

In using the coin value teaching device, the student, of course, must be able to identify the different coins being used. In this regard, the retarded child may be instructed in coin identification and a money readiness sheet may be utilized for this particular purpose. This sheet will have five different circles which identify the name and value of the five different coins. The student may then be given an assortment of coins and instructed to place the coins in the proper circle. In the event that the student or students have problems making the association of the words, the coins, and the value, coins may be applied to their proper circle by tape or the like so that the student may engage in a visual matching exercise.

After the student has learned to identify the name and value of the various coins, he may then be introduced to the transparent value members. The student may be instructed in the comparative value of the coins with these value members by observing that two of the nickel value members 20 correspond to and cover one dime value member 22. Similarly, five nickel value members 20 cover the quarter value members 24.

After the child is capable of coin identification and coin identification in association with the value members, he may then use the value members in conjunction with the number board. In this regard, he may be given problems in a workbook in a counting exercise where he is asked to specifically determine the value of several coins. In performing this exercise, the student will place the value members on the number board in the specific order as required by the problem. The student is instructed to leave no blank spaces in applying the value members to the number board. For example, if the student applies two nickel value members and three penny value members to the board, he will see that the number covered by the outer and lowermost edge of the last applied value member is the total numerical value of the coins and value members used. Specifically, the two nickel value members will be applied to the first transverse row to completely cover that row and the student will then apply the penny value members to the next adjacent row beginning at the left side or side closest adjacent to the square containing the number one on the value board. It will be noted that the square bearing the number 13 will be the last covered and this can be visually determined by the student as the value members are positioned upon the number board. In counting, the value members which are first applied to the number board are always positioned against the upper flange portion 14a and against the left side flange portion 14b.

Referring now to FIG. 7, it will be noted that the value member 24 and the value member 20 have been applied to the board so that no blanks or squares are left uncovered and those transverse rows to which the value members have been applied. The numerical value can be readily determined by looking under the outer and lowermost square covered by the last applied value member. In this example, the number 30 is readily seen to be the total acquired by applying the value member for the quarter coin and the value member for the nickel coin. It is pointed out that the higher or larger value members are applied to the board before the lower value members. Thus the quarter value member 25 is first applied to the number board and the penny value members 18 are then applied.

In FIG. 8, one dime value member, one nickel value member, and five penny value members have been applied to the board in that in order so that no blanks are left in the transverse rows to which the value members have been applied. These value members are positioned against the upper flange portion 14a and against the left flange portion 14b. The last penny value member applied covers the square containing the number 20 which can be readily and visually perceived by the child. However, it should be pointed out that the larger value members should be applied first to the number board. Thus, the numerical value of several different kinds of coins may be readily visually perceived by the child be merely following some simple instructions in making the structural relationship of the value members with respect to each other and with respect to the number board. In this regard, it will be noted that in FIG. 9 the value members when applied to the number board have their upper surfaces closed in substantially coplanar relation with respect to each other and each preferably has a coin embedded therein. The peripheral flanges 14 are helpful in positioning the value members on the number board so that the proper structural interrelationship of various value members may be achieved.

The learning may be in progressive steps or phases so that the student in the second phase may discard the number board and use only the value forms in learning to count money. In this phase, the student will have learned to assign the correct numerical value for each coin or combination of coin values. Finally, the student may be given problems and work only with real coins.

In learning to make change with money, the number board will again be used along with template such as the template 28 shown in FIG. 10. These templates may be formed of a suitable opaque material, preferably paperboard and each will have a graphic illustration of a coin thereon. The value of the template illustrated in FIG. 10, is a template for the half dollar coin and corresponds to the transparent value member 26. The templates will be placed against the lower flange portion 14d of the number board rather than the top flange portion 14a as in counting. If the template for the quarter coin is used, the template will cover the squares which have the numbers 26 through 100 which indicates to the student that he has only 25 cents to spend. Similarly, the template for the dime coin would cover the numbers 11 through 100 and would indicate to the student that he has only 10 cents to spend.

Assuming that the student has a quarter to spend, the quarter template will be applied to the number board covering and concealing the squares containing the numbers 26 through 100. If the student purchases an item which costs 17 cents, the student places an object over the square containing the number 17. He then places value members over those numbers in the squares located between the number 17 and the template.

The student is instructed in placing these value members on the squares located between the number 17 and the template to first place the penny value members 18 over the squares until the student reaches a square which has a colored background such as the group of squares indentified by the reference numerals 16a, 16b and 16c. When a square which is colored is reached, the student is instructed to place a larger value member over the remaining squares located between the covered squares and the template. Thus the student would place the penny value members 18 upon the squares containing the numbers 18, 19 and 20 and would thereafter place the value member 20 over the remaining uncovered squares. The money change the student would receive in this transaction would be three pennies and one nickel or a total of 8 cents. However, the numerical value of the coins received is not stressed but the kinds and number of coins received are stressed. Thus the student may count the value members 18 which represent pennies and the value members 20 which represent nickels. Thus, three pennies and one nickel would be the amount received and this is determined by the visual inspection of the number board along with the applied value members.

It will be seen that in utilizing the number board in a change making exercise, the structural relationship of the value members with respect to the uncovered squares on the number board is essential in permitting the student to arrive at the proper solution. Using the previous example of spending 17 cents of a quarter, the penny value members are applied to the squares containing the numbers 18, 19 and 20 and when a colored square containing a number is reached, the student then knows that he is to use a different value member. He can visually determine that the only value member which will now apply is the nickel value member, since there are only five exposed squares left on the number board between the template and the colored square containing the number 20. The student may then be asked to count or verbilize the value members being used between the square containing the number 17 and the template noting the kinds of coins used, that is, three pennies and one nickel but not the cumulative value of the coins.

From the foregoing, it will be seen that I have provided a novel coin instruction device which is especially helpful in assisting retarded children in counting coins, making change and generally how to handle money.

It will be noted that the coin instructing device comprises a number board having peripheral flanges which serve to assist in positioning value members which represent the various coins. The value members when positioned upon the number board permit a student to visually determine the numerical value of a plurality of coins. Similarly, change making procedures are also provided which utilize the value members, number board and templates.

It will therefore be seen from the foregoing description that I have provided a novel coin instruction device which is not only of simple and inexpensive construction, but one which functions in a more efficient manner than any heretofore known comparable device.

What is claimed is:

1. A coin value teaching device comprising
 a square number board having a flat upper surface and having flanges affixed thereto adjacent the longitudinal and transverse edges thereof and projecting upwardly therefrom to define a peripheral flange,
 the upper surface of said board having a plurality of transverse and longitudinal lines thereon to form the upper surface into symmetrically arranged squares of equal size, said squares being arranged in 10 transverse rows, and each row having 10 squares therein, each square having a number indicia thereon, said numbers being arranged in consecutive order in said transverse rows from the number 1 to the number 100, the number 1 being located in the square located adjacent one corner of said board, and the number 100 being located in the square in a corner of said board diagonally disposed with respect to a square containing the number 1,
 a plurality of rigid substantially flat, transparent value members each having a coin secured thereto, one of said value members corresponding in size and shape to one of said squares and having a penny coin secured thereto, another value member having a nickel coin secured thereto and being of rectangular configuration, and having a shape and size corresponding to five squares disposed in side-by-side relation, another value member being of rectangular configuration and having a dime coin secured thereto, and having a shape and size corresponding to one complete transverse row, another value member having a quarter coin secured thereto and being of a size and shape corresponding to twenty five squares,
 another value member being of rectangular configuration and having a half dollar secured thereto and being of a size and shape corresponding to one-half of the total number of squares on said number board,
 said value member when positioned on said number board singularly or in a predetermined group so that at least one of said value members engages the flange along the upper transverse edge and arranged to cover a predetermined number of transverse rows, with no squares left uncovered by said value members, indicating to an observer the total numerical value of the coins presented by the value members applied to the number board, said total numerical value being represented by the number in the square in the lowest transverse row upon which the last applied value member is positioned and in the square located in said last mentioned row covered by the last applied value member and most laterally disposed with respect to the square containing the number 1.

2. The device as defined in claim 1 wherein each value member has its associated coin embedded therein.

* * * * *